United States Patent
Idicula et al.

(10) Patent No.: US 8,326,839 B2
(45) Date of Patent: Dec. 4, 2012

(54) EFFICIENT FILE ACCESS IN A LARGE REPOSITORY USING A TWO-LEVEL CACHE

(75) Inventors: Sam Idicula, Santa Clara, CA (US); Sabina Petride, Hayward, CA (US); Bhushan Khaladkar, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 12/615,090

(22) Filed: Nov. 9, 2009

(65) Prior Publication Data
US 2011/0113036 A1   May 12, 2011

(51) Int. Cl.
G06F 7/00      (2006.01)
G06F 17/00    (2006.01)
G06F 17/30    (2006.01)

(52) U.S. Cl. .................. 707/747; 707/698; 707/758

(58) Field of Classification Search .................. 707/704, 707/804, 741; 709/238
See application file for complete search history.

(56) References Cited

U.S. PATENT DOCUMENTS

| | | | | |
|---|---|---|---|---|
| 6,115,703 | A * | 9/2000 | Bireley et al. | 707/704 |
| 7,577,754 | B2 * | 8/2009 | Garcia-Luna-Aceves et al. | 709/238 |
| 7,774,380 | B2 * | 8/2010 | Burke et al. | 707/803 |
| 8,065,308 | B2 * | 11/2011 | Shadmon et al. | 707/741 |

OTHER PUBLICATIONS

"20 Accessing Oracle XML DB Repository Data" downloaded from the Internet Aug. 25, 2009 < http://download.oracle.com/docs/cd/B19306_01/appdev.102/b14259 > 10 pages.

"1 Introduction to Oracle XML DB" downloaded from the Internet Aug. 28, 2009 < http://download.oracle.com/docs/cd/B19306_01/appdev.102/b14259 > 28 pages.

* cited by examiner

*Primary Examiner* — Susan Chen
(74) *Attorney, Agent, or Firm* — Hickman Palermo Truong Becker Bingham Wong LLP

(57) ABSTRACT

A two-level cache to facilitate resolving resource path expressions for a hierarchy of resources is described, which includes a system-wide shared cache and a session-level cache. The shared cache is organized as a hierarchy of hash tables that mirrors the structure of a repository hierarchy. A particular hash table in a shared cache includes information for the child resources of a particular resource. A database management system that manages a shared cache may control the amount of memory used by the cache by implementing a replacement policy for the cache based on one or more characteristics of the resources in the repository. The session-level cache is a single level cache in which information for target resources of resolved path expressions may be tracked. In the session-level cache, the resource information is associated with the entire path expression of the associated resource.

18 Claims, 7 Drawing Sheets

500

600

700

800

EFFICIENT FILE ACCESS IN A LARGE REPOSITORY USING A TWO-LEVEL CACHE

FIELD OF THE INVENTION

The present invention relates to path resolution, and more specifically, to using a system-wide shared cache and a session-level cache to identify the target resources of path expressions.

BACKGROUND

Hierarchically-organized data, such as file system data and XML data, etc., is used in various environments, including in relational database systems and operating systems. For ease of illustration, reference is made herein to a database managing system with database structures. However, a managing system may be a database managing system or an operating system management system, etc.

Traditional relational database systems generally excel at handling structured content that maps to rows and columns, and may be extended to manage hierarchically-organized data. For example, the Oracle XML DB is a component of Oracle Database that is optimized for handling hierarchical data. The Oracle XML DB is described in more detail in the Oracle XML DB Developer's Guide, 10g Release 2 (10.2) Part Number B14259-02, Chapter 1, accessed on Jul. 31, 2009 at "docs/cd/B19306_01/appdev.102/b14259/xdb01int.htm#ADXDB0100" on the server "download.oracle.com", the contents of which are incorporated by reference in their entirety for all purposes as if fully set forth herein.

Resources, such as files, folders, and xml nodes, etc., may be organized into hierarchical sets referred to herein as "repositories". An example hierarchical repository 100 is illustrated in FIG. 1. Repository 100 includes a root container resource 102, and other resources 104-114. A container resource is a resource that is configured to include references to one or more other resources, such as a folder. In repository 100, resources 102, 104, 106, and 110 are container resources.

A database system may store information for resources in a resource table, which generally includes, for each resource, (a) a resource identifier, (b) content of the resource, (c) attributes of the resource, and (d) references to each child resource of the resource, etc. The database system may access information for a particular resource in a resource table based on the resource identifier for the particular resource, which may be a row identifier, or a logical identifier, etc. Such access may be through an index on the resource table, such as the hierarchical index of Oracle XML DB, described in the Oracle XML DB Developer's Guide, 10g Release 2, Part Number B14259-02, Chapter 20, accessed on Aug. 25, 2009, at "docs/cd/B19306_01/appdev.102/b14259/xdb16fol.htm#g1050290" on the server "download.oracle.com", the contents of which are incorporated by reference in their entirety for all purposes as if fully set forth herein.

In a hierarchically-organized set of resources, such as repository 100, each particular resource is uniquely identified by a path expression, which generally includes (a) a list of ancestor container resources of the particular resource, and (b) the name of the particular resource. The resources listed in a path expression are separated by a special character, typically '/' or '\'. A segment of a path expression is the name of one of the resources included in the path expression and delineated by special characters. For example, resource 108 has, as ancestor container resources, resources 102, 104, and 106. Therefore, a path expression that uniquely identifies resource 108, which includes the name of resource 108 and the names of the ancestor resources of resource 108, may be as follows: "\A\B\C", where the initial '\' represents root container resource 102, "A" represents resource 104, "B" represents resource 106, and "C" represents resource 108.

As referred to herein, the "target resource" of a particular path expression is the resource that is identified by the path expression. For example, resource 108 is the target resource of the path expression "\A\B\C" in repository 100. Resolving a path expression results in identifying information for the target resource of the path expression, such as a resource identifier, contents of a resource, attributes of a resource, etc.

To resolve a particular path expression, a managing system generally maps each segment of the particular path expression to a corresponding resource in a data structure in long-term storage that represents the resources of a repository, e.g., a resource database table. By mapping a first segment of a particular path expression to a resource in the data structure, the database system may search the list of child resources for the first segment resource found in the data structure for a mapping for the subsequent segment in the particular path expression. Thus, a managing system generally performs a segment by segment lookup to resolve a path expression to the path expression's target resource. Because resource tables in a database system are generally stored in long-term memory, mapping each segment of a path expression to a resource incurs a disk access for every segment.

A hierarchical repository may include a large number of resources, and may have a deep hierarchy. As such, it is common to resolve path expressions containing several container resource names. In fact, in many access mechanisms such as HTTP and WebDAV, the same path expression fragment (a path expression ending in a container resource) may be involved in multiple requests over the same or different connections. Thus, traditional path resolution results in significant overhead, especially when accessing small or medium-sized resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
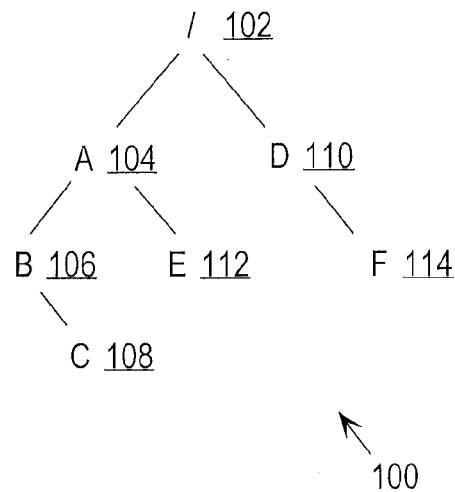
FIGS. 1, 5, and 7 illustrate example hierarchical repositories.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A two-level cache to facilitate resolving resource path expressions for a hierarchy of resources is described. The two-level cache includes a system-wide shared cache and a session-level cache. The system-wide shared cache is organized as a hierarchy of hash tables that mirrors the structure of a repository hierarchy. A particular hash table in a shared cache includes information for the child resources of a particular resource in the repository. A database management system that manages a shared cache may control the amount of memory used by the cache by implementing a replacement policy for the cache based on one or more characteristics of the resources of the repository.

The session-level cache is a single level cache in which information for target resources of resolved path expressions may be tracked. In the session-level cache, the resource information is associated with the entire path expression of the associated resource. A database system may use the described two-level cache to minimize retrieval of information for resolving resource path expressions from resource tables stored on disk.

The Two-Level Cache

The system-wide shared cache ("shared cache") of the two-level cache takes advantage of the locality of resources that are accessed across different sessions. In many cases, there are "hot" path expressions in the hierarchy that are accessed by multiple concurrent sessions. The system-wide shared cache tracks, in a hierarchy of hash tables, mappings of resource names to resource identifiers that uniquely identify the resources in the hierarchical repository. In one embodiment of the invention, other resource information is also included in the system-wide shared cache, such as resource content, attributes of resources, etc.

The shared cache is stored in shared memory, which is memory that is accessible by all processes in the managing system. Because multiple processes can access the shared cache, semaphores or other locking mechanisms are used in the shared cache to ensure that an entry in the cache can be read by multiple processes at the same time, but modified by only one process at a time. Also, all operations on the shared cache are done in a recoverable manner. For example, before performing any operation, such as adding an entry to the cache, a log of the operation and its various steps, if any, is recorded. If the process performing the operation crashes, this log helps another process to restore the shared cache to the cache's previous consistent state.

The session-level cache of the two-level cache further optimizes path resolution by taking advantage of locality of reference among the requests in the same session. For example, a user who requests a list of the contents of a certain container resource is also very likely to subsequently access one or more child resources of that container resource. The session-level cache is located in unshared memory, which is memory that is private to a particular process in a managing system. Generally other processes do not access such unshared memory, and thus, a managing system need not maintain concurrency of the data in the session-level cache.

Processes in a managing system may use the two-level cache to identify mappings between resource names in a path expression and resource identifiers. If one or more resources referred to in the segments of a path expression are included in the two-level cache, then a requesting process need not access resource tables, etc., on disk to map the included resources to resource identifiers. Because information in a cache is accessed more quickly than information on disk, resolving a path expression using the two-level cache results in time savings.

This two-level cache is based on the observations that mappings between resource names and resource identifiers are infrequently changed, and the upper levels of a resource hierarchy are changed less often than the lower levels of the hierarchy.

System-Wide Shared Cache

The shared cache is organized as a hierarchy of hash tables that mirrors the structure of a repository hierarchy. In one embodiment of the invention, a system-wide shared cache stores information for a particular repository. In another embodiment of the invention, the shared cache contains path resolution information for more than one repository in a managing system.

A particular hash table in a shared cache represents the child resources of a particular resource in the repository. A hash table having information about the children of a particular resource is described herein as corresponding to the particular resource. In one embodiment of the invention, if a hash table corresponding to a particular resource exists in the shared cache, then all of the children of a particular resource are represented in the hash table. In another embodiment of the invention, a hash table corresponding to a particular resource may include all of the child container resources of the particular resource and/or all of the child terminal resources of the particular resource. A terminal resource is a resource that is not configured to refer to other resources, e.g., a file.

The entry in a hash table for a child resource of a particular container resource includes information for the child resource, such as a resource identifier that uniquely identifies the child resource among all of the resources in a repository. Such a resource identifier may be used to locate information for the child resource in the managing system, e.g., in an appropriate resource table. If the child resource is a container resource, then the hash table entry for the child resource also includes a pointer to a hash table corresponding to the child resource, if the hash table exists. A hash table corresponding to a particular resource may not exist if (a) the resource is a terminal resource, (b) the resource is a container resource that does not refer to any other resources, i.e., the container resource has no children, (c) information for the children of the particular resource hitherto has not been added to the shared cache, as described in further detail below, or (d) the hash table has been removed according to a replacement policy, as described in more detail below.

Figure 2:
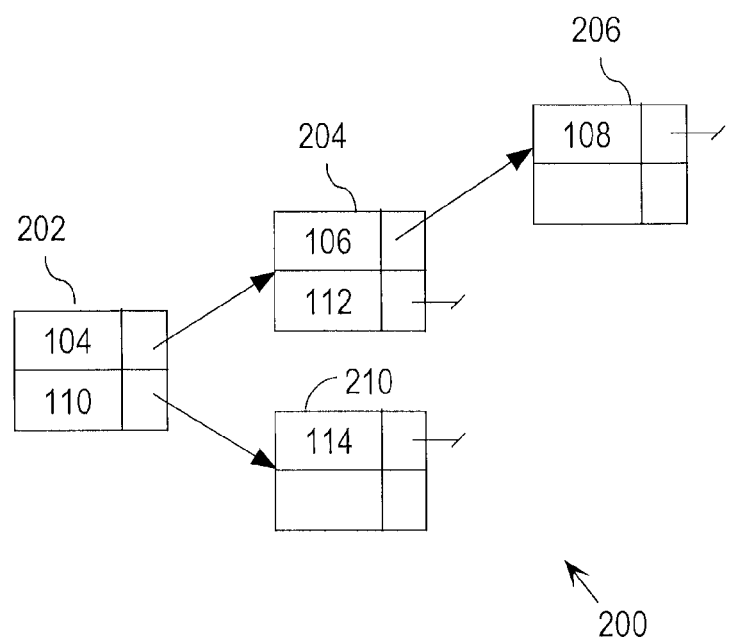
FIGS. 2, 6, and 8 illustrate hierarchical shared caches containing information for resolving path expressions in hierarchical repositories.

For example, FIG. 2 illustrates a shared cache 200 in which all of the resources of repository 100 are represented. Hash table 202 corresponds to root container resource 102, and has two entries for the child resources of container resource 102, i.e., resources 104 and 110. Each of these entries include a resource identifier for the child resource and a pointer to a hash table that corresponds to the child resource. Thus, the entry in hash table 202 that corresponds to resource 104 includes a pointer to hash table 204 that corresponds to resource 104. Hash table 204 includes an entry for each of resource 106 and resource 112. The entry for resource 112 includes a resource identifier for resource 112, and does not include a pointer to a hash table because resource 112 has no child resources. The entry for resource 106 includes a resource identifier for resource 106 and a pointer to hash table 206 that corresponds to resource 106. Hash table 206 includes one entry for the child resource of resource 106, i.e., resource 108. Furthermore, the entry for resource 110 in hash table 202 includes a resource identifier for resource 110 and a pointer to hash table 210, which includes an entry for the child resource of resource 110, i.e., resource 114.

Resolving a Path Expression Using the Shared Cache

A shared cache may be used to map one or more segments of a path expression to resource identifiers for the corresponding resources. Thus, a managing system may use a shared cache to resolve all or part of a path expression.

In one embodiment of the invention, if a hash table corresponding to a particular container resource exists in a shared cache, then the managing system assumes that all of the children of the particular container resource are represented in the hash table. In another embodiment of the invention, a shared cache includes information about what kinds of children are included in a particular hash table corresponding to a particular container resource. For example, information stored at the shared cache may indicate that a particular hash table has information for all container children of the particular container resource, for all terminal children of the particular container resource, or for both.

Figure 3:
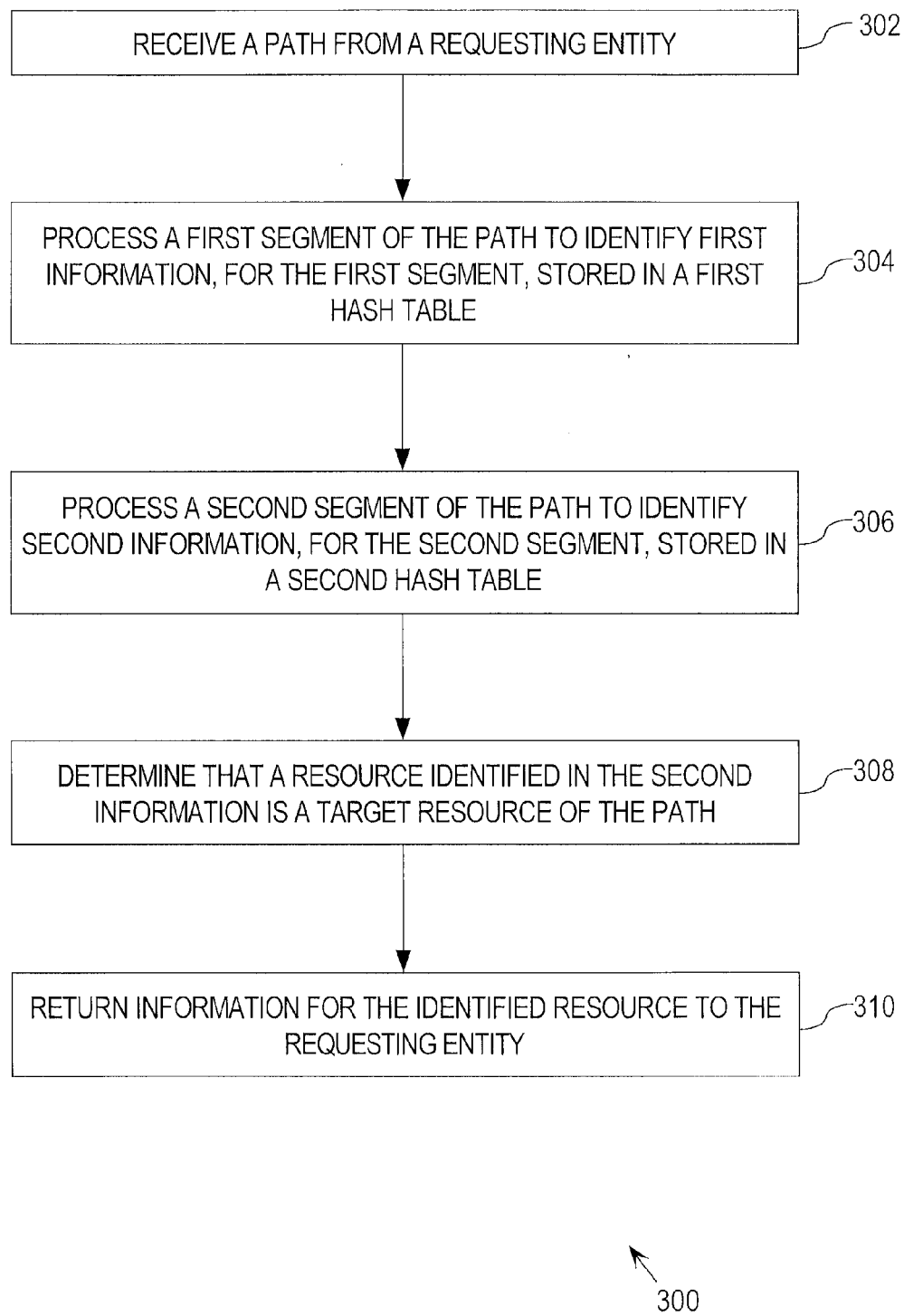
FIG. 3 illustrates an example method for resolving a particular path expression using a shared cache.

FIG. 3 illustrates an example method 300 of resolving a particular path expression using a shared cache. At step 302, a path expression is received from a requesting entity. For example, the managing system managing repository 100 and shared cache 200 receives a request to resolve the path expression "\A\E" from a client, e.g., as part of a SQL query on repository 100.

At step 304, a first segment of the path expression is processed to identify first information, for the first segment, stored in a first hash table. Continuing with the previous example, the managing system determines that the received path expression, "\A\E", starts at root container resource 102, as indicated by the initial special character '\'. Thus, the managing system starts resolving the received path expression using hash table 202, in shared cache 200, which corresponds to root container resource 102.

The managing system determines that the first segment of the received path expression, as indicated by the first resource name delineated by the first two special characters, is "A". The managing system applies a hash function specified for hash table 202 to the first path expression segment. The hash function returns a segment hash index that the managing system uses as an index into hash table 202. The segment hash index identifies a bucket in the hash table 202 that includes an entry for resource "A", i.e., resource 104. This entry has a resource identifier for resource 104 and a pointer to hash table 204, in which information for the child resources of resource 104 is stored. In one embodiment of the invention, each hash table in a shared cache may utilize a different hash function. In another embodiment of the invention, the hash function is the same for all of the tables in a given shared cache.

At step 306, a second segment of the path expression is processed to identify second information, for the second segment, stored in a second hash table. For example, the managing system determines that the second segment of the given example path expression is "E". Because resource "E" is identified in the path expression as a direct child of resource "A", i.e., resource 104, the managing system searches for resource "E" in the hash table for the children of resource 104. Thus, the managing system processes the identified segment "E" over hash table 204, which is the hash table pointed to in the entry for resource 104. Specifically, the managing system applies a hash function for hash table 204 to the second path expression segment, "E", to find a second segment hash index. The managing system uses the second segment hash index as an index into hash table 204 to find the entry for resource "E". The entry for resource "E" in hash table 204 includes a unique identifier for resource 112.

At step 308, it is determined that a resource identified in the second information is a target resource of the path expression. For example, the managing system determines that resource "E", i.e., resource 112 is the last resource in the path expression received from the requesting entity, and therefore is the target resource of the path expression.

At step 310, information for the identified resource is returned to the requesting entity. For example, the managing system returns information for the target resource, resource 112, to the requesting entity, which is the entity that provided the path expression. The returned information may include the resource identifier for resource 112, the content of resource 112, attributes of resource 112, etc.

Updating Resources Represented in the Shared Cache

In one embodiment of the invention, the shared cache is immediately updated to reflect any change made to the repository, subject to the applicable replacement policy described in further detail below. Immediately updating a shared cache may include updating the shared cache to reflect changes made in a repository as soon as possible after the changes are made. Changes to resources that may be reflected in the shared cache include creating a resource, deleting a resource, and renaming a resource, etc. When a resource is renamed, the cache may be updated by removing the old name from the hash tables and adding a mapping for the new name.

In another embodiment of the invention, only operations that modify child resources of a resource that has a corresponding hash table in a shared cache cause the shared cache to be immediately updated to reflect the modifications. In this embodiment of the invention, if the child resources of a container resource are modified, where the container resource does not have a corresponding hash table in the shared cache, the shared cache need not be immediately updated.

If the modification of a resource is to be immediately reflected in a shared cache, then the shared cache is updated upon finalization of the resource modification. For example, in the context of a database system, the results of a transaction are not final until the transaction commits. Committing a transaction means making permanent the changes performed by the SQL statements within the transaction. Prior to committing a transaction being performed by a particular process, any changes to the resources of a repository caused by the transaction are not visible to other processes. Further, in a cluster environment, updates are propagated to other nodes in the cluster when the local shared cache is updated.

Figure 4:
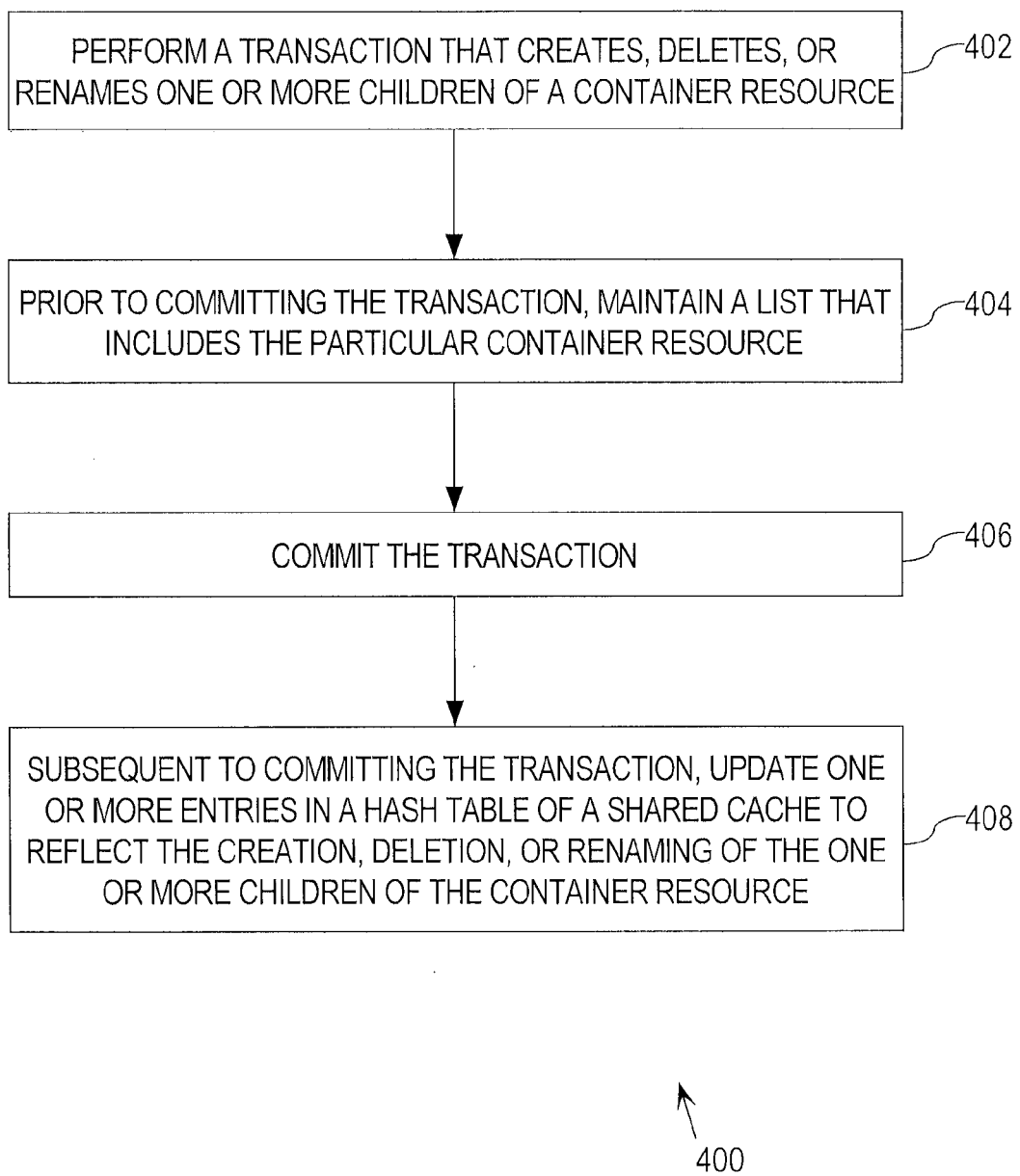
FIG. 4 illustrates an example method of updating a shared cache.
Figure 5:
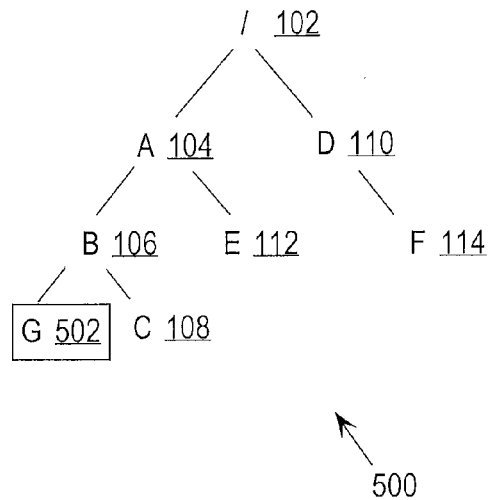

FIG. 4 illustrates an example method 400 of updating a shared cache. At step 402, a transaction is performed that creates, deletes, or renames one or more children of a container resource. For example, a managing system performs the actions specified in a SQL statement on repository 100 to create a child resource under resource 106, as illustrated by resource 502 in example repository 500 of FIG. 5. Creation, deletion, and renaming of resources are examples of modifications that may cause an update in a cache.

At step 404, prior to committing the transaction, a list is maintained that includes the particular container resource. In one embodiment of the invention, a managing system maintains a list, for a particular transaction, that includes information for all container resources in which child resources are added, deleted, or renamed during the particular transaction. The list may include an identifier for the container resource and may also include a record of the specific resource modification performed. For example, the managing system managing repository 500 and shared cache 200 maintains a list of container resources having child resources that are modified by the SQL statement of the previous example. Such a list includes resource 106 because the SQL statement added a child resource, resource 502, to the child resources of resource 106.

At step 406, the transaction is committed. For example, the managing system makes the changes requested by the SQL statement permanent and visible to processes not performing the transaction.

Figure 6:
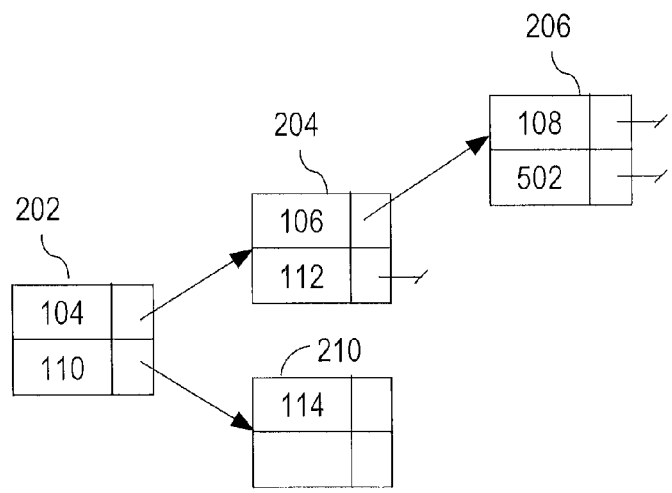

At step 408, subsequent to committing the transaction, one or more entries in a hash table of a shared cache are updated to reflect the creation, deletion, or renaming of the one or more children of the container resource. For example, the managing system determines that the shared cache for repository 500, shared cache 200, currently includes a hash table for the children of resource 106. Thus, the changes to the children of resource 106 made during the committed transaction should be reflected in the shared cache immediately. Shared cache 200 is updated to include child resource 502 in existing hash table 206, as illustrated in shared cache 600 of FIG. 6.

Adding Resources to the Shared Cache

Furthermore, when a managing system resolves a path expression using the shared cache, one or more of the resources referred to in the path expression may not be included in the shared cache. If a resource corresponding to a segment of a path expression is not represented in the shared cache, then the managing system may add information for the resource to the shared cache.

Figure 7:
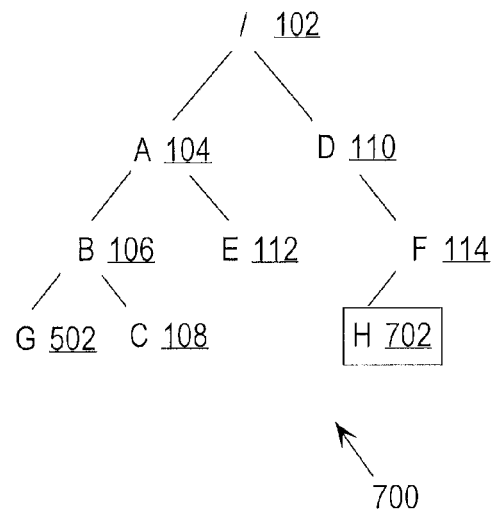

For example, repository 500 is modified as shown in repository 700 of FIG. 7, i.e., to include resource 702 as a child resource of resource 114. This modification is not reflected in shared cache 600 immediately subsequent to the modification because the shared cache does not include a hash table for the child resources of resource 114. After the modifications, a requesting entity requests that the managing system resolve the path expression "\D\F\H" in repository 700. The managing system attempts to resolve the given path expression using shared cache 600, as described above in connection with method 300 of FIG. 3. However, shared cache 600 does not include information on child resources of resource "F", i.e., resource 114. Thus, the managing system cannot resolve the entire path expression "\D\F\H" using shared cache 600.

A managing system may partially resolve a path expression using a shared cache, and then finish resolving the path expression using other methods, such as using the resource table on disk. In the above example, the managing system looks up resource 114 in an appropriate resource table using the unique identifier for the resource retrieved from hash table 210. The managing system may then determine a resource identifier for a resource named "H" among the child resources of resource 114, as indicated in the requested path expression, and return information from the resource table for resource "H" to the requesting entity.

Figure 8:
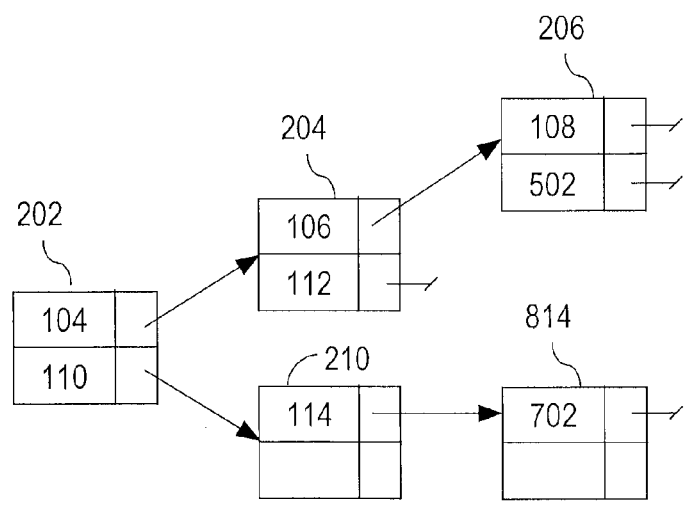

In this example, information for resource "H" may be added to the shared cache so that any proximate references to resource "H" will not require any disk access to resolve. Adding information for resource "H" involves adding a new hash table with information for resource "H", i.e., resource 702, to the shared cache to represent the child resources of resource 114, as illustrated in shared cache 800 at hash table 814 of FIG. 8.

In one embodiment of the invention, prior to adding a new hash table to a shared cache, the managing system determines a reason why the hash table does not already exist in the shared cache. In the above example, no hash table for resource 114 exists because resource 702 has been recently added to the hierarchy and has not yet been sought by a requesting entity. Thus, the managing system updates the shared cache to include hash table 814 corresponding to resource 114. If the hash table corresponding to resource 114 does not exist in the shared cache because the hash table has been evicted, then the managing system determines whether or not to return the hash table to the shared cache based on a replacement policy, such as the replacement policy described below.

Replacement Policy

A database management system that manages a shared cache may implement a replacement policy to control the amount of memory used by the cache. In one embodiment of the invention, a configurable parameter is set to indicate the maximum amount of memory to be used for a shared cache. When the amount of memory occupied by the shared cache reaches the maximum allowed size and a new entry needs to be added to the cache, the managing system determines which hash tables and/or hash table entries to remove from the cache based on the replacement policy. This replacement policy may use one or more factors to determine which resources to evict from the shared cache, such as recency of access of a resource, the level at which a resource occurs, the frequency with which a resource is changed, and hash table size.

An entry in a shared cache that has been accessed recently is given higher priority than an entry that has been accessed less recently. Priority is assigned in this manner because a recently used entry is more likely to be useful than a less recently used entry. In this context, an entry with a lower priority is removed from the shared cache before an entry with a higher priority. In order to track the recency of access of entries in a shared cache, a list of pointers to the cache entries may be maintained; each time a particular entry is accessed, the entry is brought to the head of the list of pointers.

Entries for container resources that are high in the hierarchy, i.e., closer to the root of the hierarchy, are given high priority because high-level container resources are more likely to be used by a variety of sessions. For example, when a container resource that is lower in the hierarchy is accessed, the ancestors of the container resource are almost always accessed.

Because the size of hash tables may vary due to the variance in the number of child resource for container resources, hash tables that are smaller are given higher priority over larger hash tables. Evicting a large hash table from a cache frees up more memory space than evicting a small hash table.

Further, the frequency with which the children of a particular resource are changed may affect the decision of which files to retain in the shared cache. If the children of a particular container resource are getting changed frequently, then the hash table for the particular container resource is given a low priority. In certain embodiments of the invention, a frequently changing set of child notes is evicted once the frequency of the changes reaches a specified threshold.

In one embodiment of the invention, when the children of a particular container resources are evicted from the shared cache, a skeleton of the hash table is maintained for the container resource. For example, all of the child container resources for the particular container resources are maintained in the hash table while all of the child terminal resources are evicted. With such a skeleton, the managing system may continue to resolve resources that are descendants of the particular container resource. Thus, the amount of memory in the shared cache used for a container resource that has a low priority may be lessened while maintaining the ability to resolve path expressions that involve the low priority container resource. Further, the skeleton for a particular container resource may be evicted if the space taken up by the skeleton is needed to cache more important resources.

Evicted resources may be returned to the shared cache. However, if one terminal resource among the children of a resource is returned to the cache, all terminal resources that are children of the resource are returned to the cache. Further, if one container resource among the children of a resource is returned to the cache, all container resources that are children of the resource are returned to the cache. Thus, the managing system may determine that a resource does not exist if it is not found among the resources that are included in the shared cache.

Session-Level Cache

The session-level cache is a single level cache, stored in unshared memory, in which information, such as resource identifiers, for the target resources of path expressions resolved by a particular process may be tracked. The information is associated in the session-level cache with the entire path expression to the target resource. The session-level cache takes advantage of session-level locality of reference, i.e., if a process accesses a file once, it is likely that the process will access the file again in a short amount of time. For example, when a web site is accessed, the same image may be accessed by a particular process several times within a few seconds.

For example, if a client requests that a particular process resolve the path expression "\A\B\C" against repository 700, then the process may check a session-level cache to determine if the resource identifier for the target resource of the path expression is stored in the cache. To make that determination, the managing system applies a hash function to the requested path expression and uses the resulting path hash index as an index into the session-level cache hash table. If information for the target resource is included in the session-level cache, then the process need not continue searching for the information, e.g., in a shared cache or in a resource table on disk.

If the session-level cache does not include information for the target resource of the path expression "\A\B\C", then the process may resolve the path expression using another cache, or database tables, etc. The process may then store information for the target resource of the path expression in the session-level cache, indexed by the path hash index determined by applying the hash function to the path expression "\A\B\C". Thus, the process may quickly cache recently used path resolutions.

The managing system may incorporate changes to resources, performed by a particular process, in the session-level cache for the process. In one embodiment of the invention, the managing system updates the session-level cache in a manner similar to the update method described above in connection with the shared cache. In another embodiment of the invention, the process corresponding to a particular session-level cache causes resources that have been changed or may have been change to be evicted from the session-level cache.

However, the session-level cache does not incorporate changes to resources performed by other processes in the managing system. Therefore, the entries in the session-level cache expire after a certain configurable amount of time (e.g., T seconds) to allow for events that change the mapping of a resource name to a resource identifier. For example, an event that changes such a mapping is removing a file and creating another file with the same name in the same directory as the removed file. Within this configurable amount of time, users accept possibly stale results from the session-level cache.

In one embodiment of the invention, a process may use a session level table to resolve part of a requested path expression. For example, if the requested path expression, e.g., "\A\B\C", is not found in a session-level cache, a process may determine whether a partial path expression, such as "\A\B", or "\A" is found in the session-level cache. If a partial path expression is found in the session-level cache, then the information stored in the session-level cache for the partial path expression may be utilized in resolving the remainder of the path expression using another cache, or using database tables, etc.

Resolving Path Expressions Using Both Caches

Figure 9:
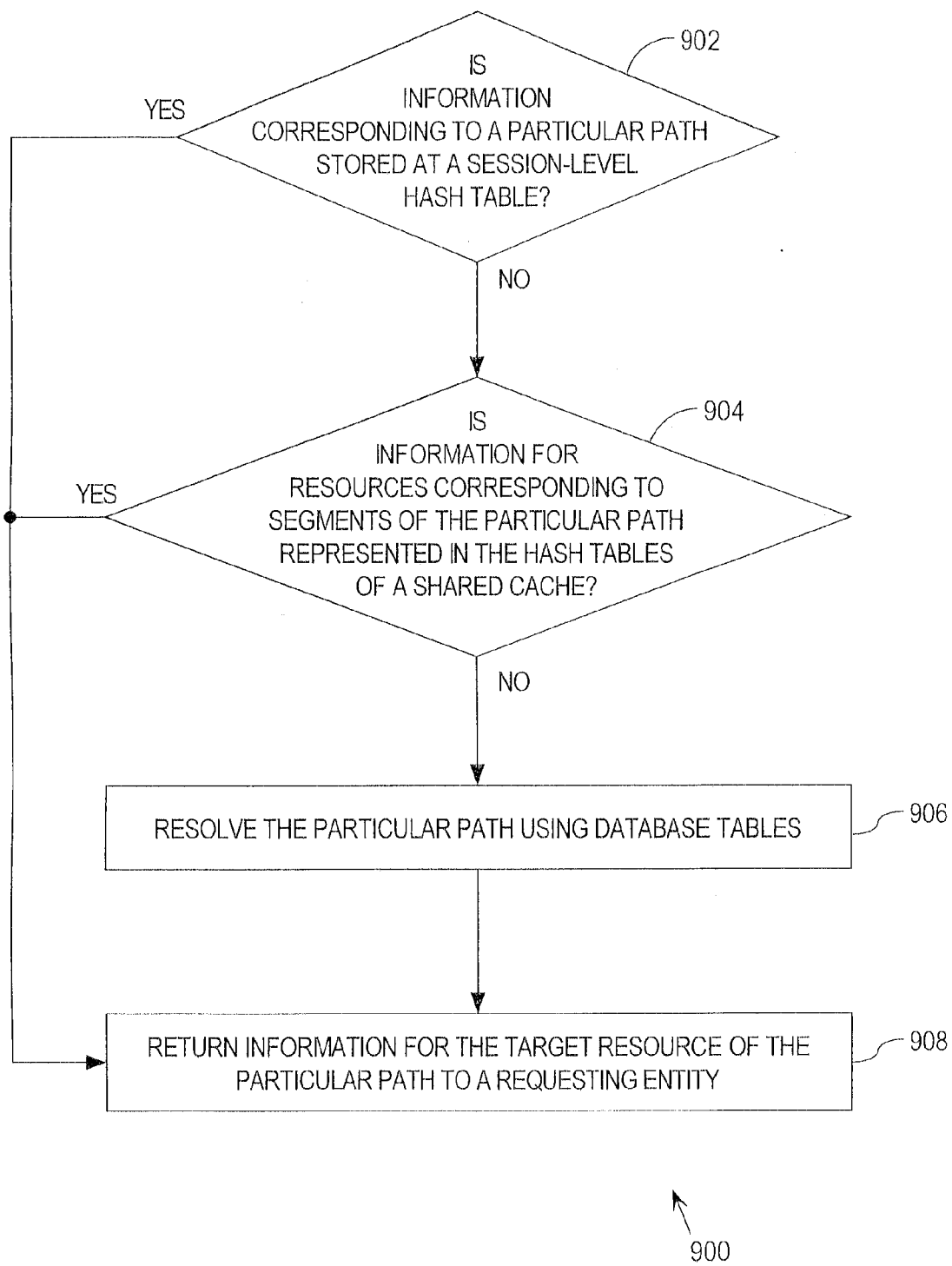
FIG. 9 illustrates an example method for resolving a path expression using both a session-level cache and a shared cache.

A shared cache and a session-level cache may be used in conjunction to resolve a path expression. FIG. 9 illustrates an example method 900 for resolving a path expression using both the session-level cache and the shared cache.

At step 902, it is determined whether information corresponding to a particular path expression is stored at a session-level hash table. For example, a particular process receives a request to resolve the path expression "\A\B\C" in repository 700. The particular process seeks information about the target resource of the path expression by applying a hash function to the path expression, and using the resulting path hash index as an index into a session-level cache. If the bucket indexed by the path hash index contains information about the target resource for "\A\B\C", then method 900 advances to step 908 at which information for the target resource of the particular path expression is returned to a requesting entity.

At step 904, in response to determining that information corresponding to the particular path expression is not stored at the session-level hash table, it is determined whether information for resources corresponding to segments of the particular path expression are represented in the hash tables of a shared cache. For example, the managing system may attempt to resolve the requested path expression, "\A\B\C", in a shared cache as described above in connection with method 300 of FIG. 3. If the managing system is able to identify information for a target resource of the path expression using the shared cache, then method 900 continues to step 908.

If information for the target resource of the requested path expression is not found, either because none of the resources referred to in the path expression are included in the shared cache, or because only some of these resources are in the shared cache, then the managing system resolves the path expression outside of the two-level cache, e.g., using database tables. Thus, at this point, method 900 continues at step 906 to resolve the particular path expression using database tables.

For example, the managing system uses a partial path resolution obtained from the two-level cache, if any, to look up resources referred to in the path expression using a resource table. The information for the target resource of the particular path expression is then returned to the requesting entity at step 908. As described above, the information retrieved from disk may also be stored in one or more of the shared cache and the session-level cache.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
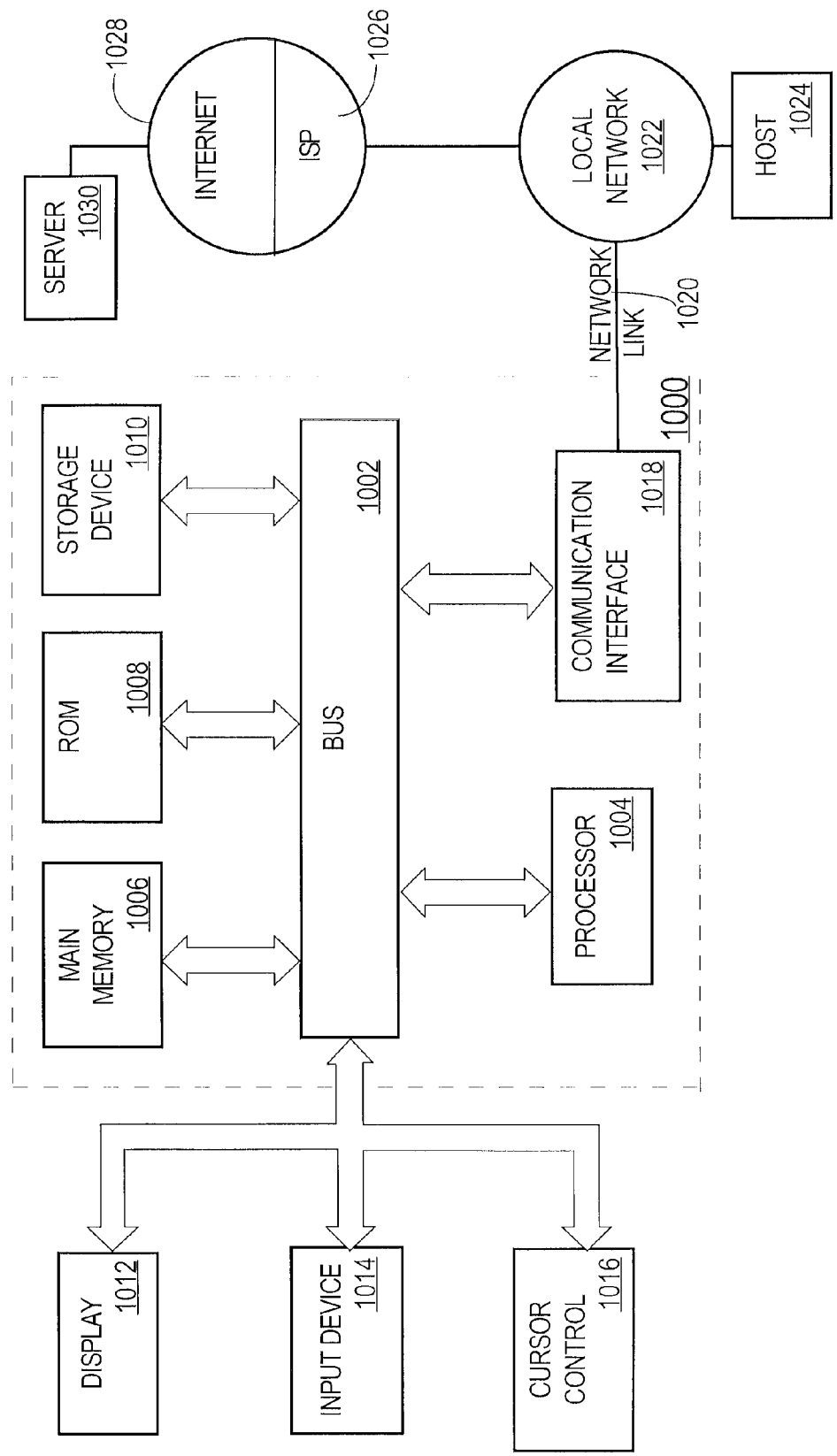
FIG. 10 is a block diagram of a computer system on which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method for resolving a path expression to a node in a hierarchy of resources comprising:
   determining whether information corresponding to the path expression is stored at a session-level hash table;
   in response to determining that information corresponding to the path expression is not stored at the session-level hash table:
      identifying first information, stored in a first hash table, based, at least in part, on a first segment of a plurality of segments in the path expression,
      wherein the first segment refers to a particular container resource in the hierarchy of resources,
      wherein the first information includes a resource identifier for the particular container resource and a pointer to a second hash table, and
      identifying second information, stored in the second hash table, based, at least in part, on a second segment of the plurality of segments in the path expression;
   wherein the first and second hash tables are part of a hierarchy of hash tables, each hash table of the hierarchy of hash tables storing information for resources in the hierarchy of resources;
   wherein the session-level hash table is distinct from the hierarchy of hash tables; and
   wherein the method is performed by one or more computing devices.

2. The computer-executed method of claim 1:
   wherein the second segment represents a child resource of the particular container resource; and
   wherein the second information includes a resource identifier for the child resource.

3. The computer-executed method of claim 2, further comprising:
   prior to identifying the first and second information, receiving the path expression from a requesting entity;
   determining that the child resource is a target resource of the path expression; and
   returning information for the child resource to the requesting entity.

4. The computer-executed method of claim 1, further comprising:
   performing a transaction that creates, deletes, or renames one or more children of the particular container resource;
   prior to committing the transaction, maintaining a list that includes the particular container resource;
   committing the transaction; and
   subsequent to committing the transaction, updating one or more entries in the second hash table to reflect the creation, deletion, or renaming of the one or more children of the particular container resource.

5. The computer-executed method of claim 4, wherein the list includes information about changes made to the one or more children of the particular container resource during the transaction.

6. The computer-executed method of claim 1, wherein the hierarchy of resources is managed by a relational database system.

7. The computer-executed method of claim 1, wherein:
   the hierarchy of hash tables is in shared memory; and
   the session-level hash table is in unshared memory accessible by a process that performs said determining whether information corresponding to the path expression is stored at the session-level hash table.

8. The computer-executed method of claim 1, further comprising removing a particular entry, corresponding to the second segment, from the second hash table based on a characteristic of a resource associated with the particular entry.

9. The computer-executed method of claim 8, wherein the characteristic of the resource associated with the particular entry is one of:
   (a) recency of access of the resource;
   (b) a level at which the resource occurs in the hierarchy of resources;
   (c) a frequency with which the resource is changed; and
   (d) a size of one or more hash table entries associated with the resource.

10. A computer-readable storage medium that stores instructions which, when executed by one or more processors, cause:
   determining whether information corresponding to the path expression is stored at a session-level hash table;
   in response to determining that information corresponding to the path expression is not stored at the session-level hash table:
      identifying first information, stored in a first hash table, based, at least in part, on a first segment of a plurality of segments in the path expression,
      wherein the first segment refers to a particular container resource in the hierarchy of resources,
      wherein the first information includes a resource identifier for the particular container resource and a pointer to a second hash table, and identifying second information, stored in the second hash table, based, at least in part, on a second segment of the plurality of segments in the path expression;

wherein the first and second hash tables are part of a hierarchy of hash tables, each hash table of the hierarchy of hash tables storing information for resources in the hierarchy of resources; and wherein the session-level hash table is distinct from the hierarchy of hash tables.

11. The computer-readable storage medium of claim 10:

wherein the second segment represents a child resource of the particular container resource; and wherein the second information includes a resource identifier for the child resource.

12. The computer-readable storage medium of claim 11, further comprising instructions for:

prior to identifying the first and second information, receiving the path expression from a requesting entity;

determining that the child resource is a target resource of the path expression; and returning information for the child resource to the requesting entity.

13. The computer-readable storage medium of claim 10, further comprising instructions for:

performing a transaction that creates, deletes, or renames one or more children of the particular container resource;

prior to committing the transaction, maintaining a list that includes the particular container resource;

committing the transaction; and subsequent to committing the transaction, updating one or more entries in the second hash table to reflect the creation, deletion, or renaming of the one or more children of the particular container resource.

14. The computer-readable storage medium of claim 13, wherein the list includes information about changes made to the one or more children of the particular container resource during the transaction.

15. The computer-readable storage medium of claim 10, wherein the hierarchy of resources is managed by a relational database system.

16. The computer-readable storage medium of claim 10, wherein:

the hierarchy of hash tables is in shared memory; and the session-level hash table is in unshared memory accessible by a process that performs said determining whether information corresponding to the path expression is stored at the session-level hash table.

17. The computer-readable storage medium of claim 10, further comprising instructions for removing a particular entry, corresponding to the second segment, from the second hash table based on a characteristic of a resource associated with the particular entry.

18. The computer-readable storage medium of claim 17, wherein the characteristic of the resource associated with the particular entry is one of:

(a) recency of access of the resource;

(b) a level at which the resource occurs in the hierarchy of resources;

(c) a frequency with which the resource is changed; and (d) a size of one or more hash table entries associated with the resource.

\* \* \* \* \*